United States Patent
Tomiyasu

[11] Patent Number: 5,823,061
[45] Date of Patent: Oct. 20, 1998

[54] INDUSTRIAL ROBOT

[75] Inventor: Kazuhiro Tomiyasu, Fukuoka, Japan

[73] Assignee: Kabushiki Kaisha Yaskawa Denki, Kitakyushu, Japan

[21] Appl. No.: 875,374
[22] PCT Filed: Nov. 21, 1996
[86] PCT No.: PCT/JP96/03423
§ 371 Date: Jul. 25, 1997
§ 102(e) Date: Jul. 25, 1997
[87] PCT Pub. No.: WO97/19789
PCT Pub. Date: May 6, 1997

[30] Foreign Application Priority Data

Nov. 29, 1995 [JP] Japan .................... 7-335963

[51] Int. Cl.$^6$ ................ B25J 9/06; B25J 17/00
[52] U.S. Cl. .............. 74/490.03; 901/15; 901/23
[58] Field of Search ............. 74/490.03, 490.05; 901/15, 23, 25; 414/735

[56] References Cited

U.S. PATENT DOCUMENTS

| 4,540,332 | 9/1985 | Nakashima et al. | 901/15 |
| 5,064,340 | 11/1991 | Genov et al. | 901/15 |
| 5,155,423 | 10/1992 | Karlen et al. | 901/15 |
| 5,584,646 | 12/1986 | Lewis et al. | 901/15 |

FOREIGN PATENT DOCUMENTS

| 2-23981 | 2/1990 | Japan . |
| 2-19879 | 8/1990 | Japan . |
| 6-114786 | 4/1994 | Japan . |

Primary Examiner—Rodney H. Bonck
Assistant Examiner—William C. Joyce
Attorney, Agent, or Firm—Morgan, Lewis & Bockius LLP

[57] ABSTRACT

An industrial robot in which the exchange work of a reduction gear is easy is provided. In the industrial robot, an intermediate member (6) having a disc portion (61), a flange portion (63) provided on an outer circumference of the disc portion (61), and a through hole (64) provided in a center of the disc portion (61) is provided between a speed reduction mechanism portion (22) of a reduction gear (2) fixed on a base (1) and a revolving portion (3); a through hole (32) is provided in a bottom portion (31) of the revolving portion (3) so as to be concentric with a rotation axis (S) and so as to have an inner diameter larger than an outer diameter of a stationary portion (21) of the reduction gear (2); the disc portion (61) of the intermediate member (6) is fixed to an upper surface of the speed reduction mechanism portion (22), and the flange portion (63) is fixed to the bottom portion (31) of the revolving portion (3); a lower surface of the revolving portion (3) is made opposite to an upper surface of the base (1) through a gap; and a driving motor (4) is fixed to the disc portion (61) of the intermediate member (6) concentrically with the rotation axis (S), and an output shaft (41) of the driving motor (4) is coupled with the speed reduction mechanism portion (22).

1 Claim, 2 Drawing Sheets

INDUSTRIAL ROBOT

FIELD OF THE INVENTION

The present invention relates to an industrial robot having a revolving portion which revolves on a base.

BACKGROUND OF THE INVENTION

Conventionally, in an industrial robot having a revolving portion mounted with a plurality of arms, for example, as shown in FIG. 2, a stationary portion 21 of a reduction gear 2 is fixed on a base 1 concentrically with a vertically extending rotation axis S, as a constituent member. A speed reduction mechanism portion 22 of the reduction gear 2 is supported on the stationary portion 21 through a bearing 23, and a bottom portion 31 of a revolving portion 3 is fixed to the speed reduction mechanism portion 22. A driving motor 4 is attached to the bottom portion 31 of the revolving portion 3 so as to rotate the revolving portion 3 concentrically with the rotation axis S. An output shaft 41 of the driving motor 4 is made to project downward through a through hole 32 provided in the bottom portion 31, and a small gear 42 is fixed to the output shaft 41 and is geared with an input gear 24 of the speed reduction mechanism portion 22 to thereby drive the speed reduction mechanism portion 22.

On the revolving portion 3, as shown in FIG. 3, a first arm 5A is supported rotatably around a horizontally extending rotation axis L, a second arm 5B is supported rotatably around a horizontally extending rotation axis U on the forward end side of the first arm 5A, a third arm 5C is supported rotatably around a rotation axis R extending in the longitudinal direction of the second arm 5B on the forward end side of the second arm 5B, and a wrist portion 5D is supported rotatably around a rotation axis B extending perpendicularly to the rotation axis R on the forward end side of the third arm 5C. The wrist portion 5D is provided with an end effector 5E for driving a tool or the like.

In the above-mentioned prior art, however, it is necessary to remove the revolving portion 3 when the reduction gear 2 is exchanged for repair or changing the specifications. Since the revolving portion 3 is mounted with heavy structures such as arms and so on, not only it is necessary to provide an equipment such as a crane, but also it is necessary to provide a large working place, or it is necessary to move the whole of the robot. Thus, there has been a problem that much trouble is inevitable.

DISCLOSURE OF THE INVENTION

It is an object of the present invention to provide an industrial robot in which a reduction gear can be exchanged without removing a revolving portion or any structure such as an arm or the like.

In order to attain the foregoing object, the present invention provides an industrial robot which comprises: a base provided with a mounting seat at its central upper portion; a reduction gear having a stationary portion fixed to the mounting seat so as to be concentric with a vertically extending rotation axis, and a speed reduction mechanism portion supported on the stationary portion through a bearing; a driving motor for driving the reduction gear; and a revolving portion rotatably supported through the speed reduction mechanism portion of the reduction gear, and mounted with arms; wherein an intermediate member having a disc portion, a flange portion provided on an outer circumference of the disc portion, and a through hole provided in a center of the disc portion is provided between the speed reduction mechanism portion and the revolving portion, wherein a through hole is provided in a bottom portion of the revolving portion so as to be concentric with the rotation axis and so as to have an inner diameter larger than an outer diameter of the stationary portion of the reduction gear, wherein the disc portion of the intermediate member is fixed to an upper surface of the speed reduction mechanism portion, and the flange portion is fixed to the bottom portion of the revolving portion, wherein a lower surface of the revolving portion is made opposite to an upper surface of the base through an air gap, and wherein the driving motor is fixed to the disc portion of the intermediate member concentrically with the rotation axis, and an output shaft of the driving motor is coupled with the speed reduction mechanism portion.

BEST MODE FOR PRACTICING THE INVENTION

Figure 1:
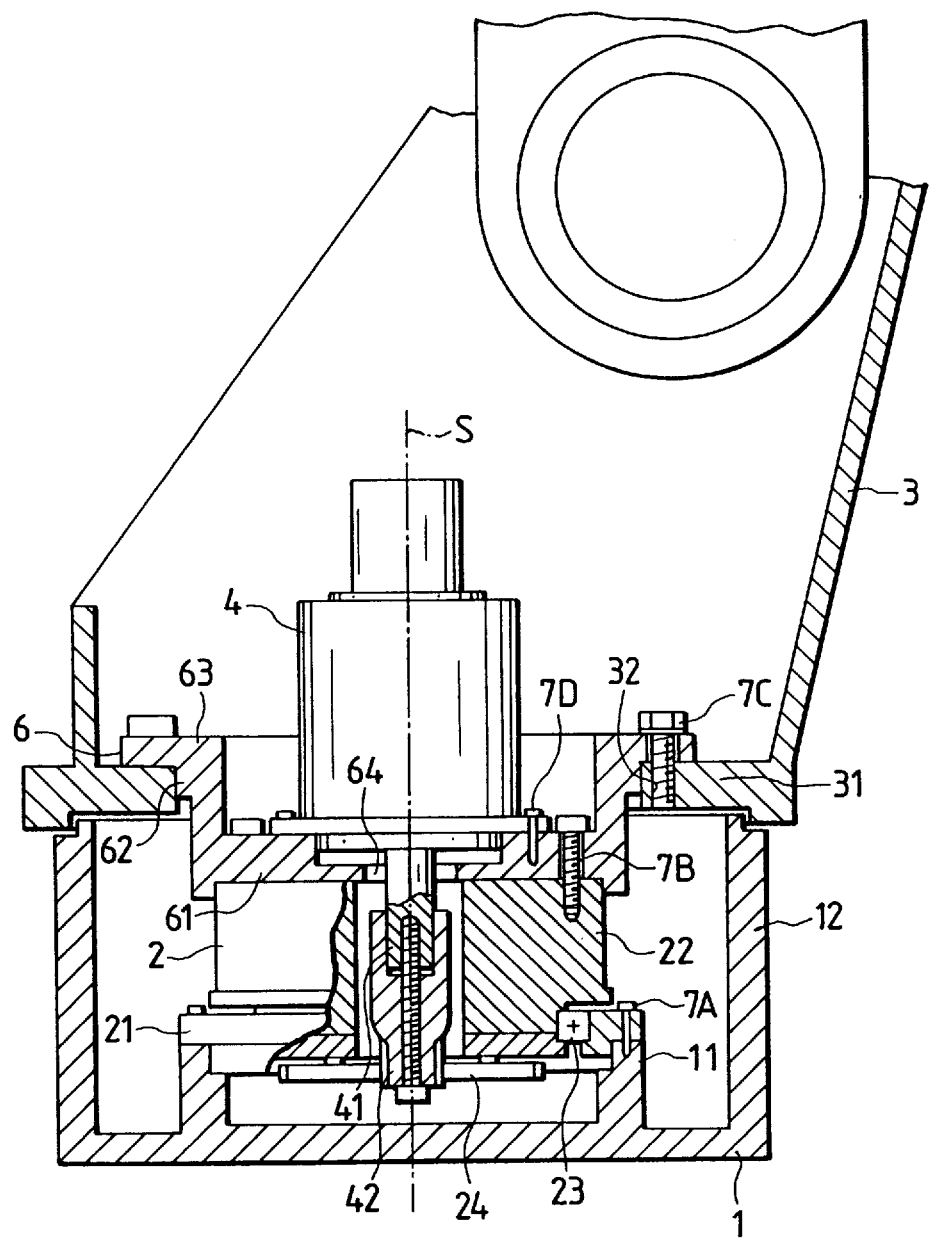
FIG. 1 is a sectional side view illustrating an embodiment of the present invention.
Figure 2:
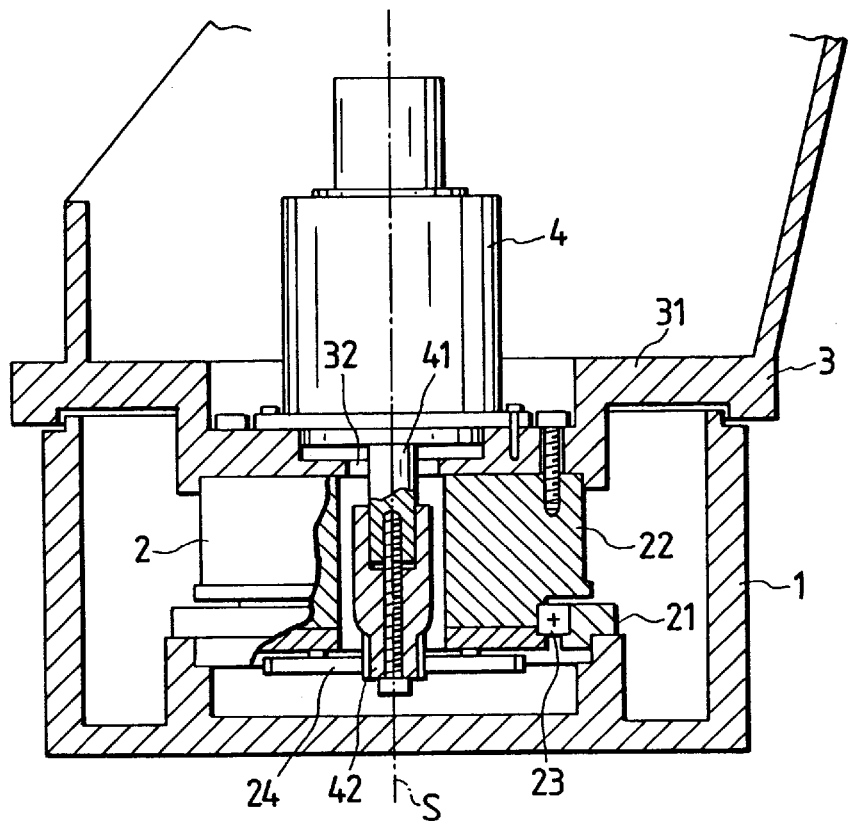
FIG. 2 is a sectional side view illustrating a conventional example.
Figure 3:
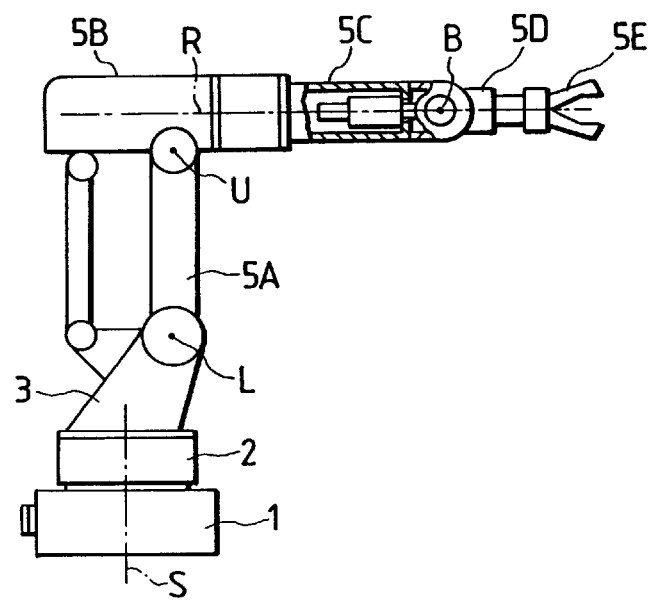
FIG. 3 is a side view of an industrial robot.

The present invention will be described with respect to an embodiment shown in the drawing.

FIG. 1 is a sectional side view illustrating a main portion of an embodiment of the present invention. In FIG. 1, reference numeral 1 represents a base provided with a mounting seat 11 on its central upper surface. Reference numeral 12 represents an outer frame formed around the base 1. Reference numeral 2 represents a reduction gear fixed onto the base 1 concentrically with a vertically extending rotation axis S. A stationary portion 21 of the reduction gear 2 is fixed to the mounting seat 11 by bolts 7A. Reference numeral 22 represents a speed reduction mechanism portion of the reduction gear 2 which is fixed to the stationary portion 21 through a bearing 23. Reference numeral 3 represents a revolving portion which supports arms and so on. Reference numeral 31 represents a bottom portion provided with a through hole 32 which is concentric with the rotation axis S and the inner diameter of which is larger than the outer diameter of the stationary portion 21 of the reduction gear 2.

Reference numeral 6 represents an intermediate member constituted by a disc portion 61 provided at its center, a stepped portion 62 provided on the outside of the disc portion, a flange portion 63 provided on the outer circumference of the stepped portion 62, and a through hole 64 provided in the center of the disc portion 61. The disc portion 61 is fixed to the upper surface of the speed reduction mechanism portion 22 by means of bolts 7B, and the stepped portion 62 fits in the through hole 32. The flange portion 63 is fixed to the bottom portion 31 by means of bolts 7C so that the lower surface of the revolving portion 3 is in opposition to the upper surface of the outer frame 12 of the base 1 through an air gap.

Reference numeral 4 represents a driving motor for rotating the revolving portion 3. The driving motor 3 is fixed to the disc portion 61 of the intermediate member 6 by means of bolts 7D so as to be concentric with the rotation axis S. Reference numeral 41 represents an output shaft of the driving motor 4 which projects downward from the through hole 64 provided in the intermediate member 6. Reference numeral 42 represents a small gear fixed to the output shaft 41, and 24 represents an input gear of the speed reduction mechanism portion 22 which is geared with the small gear 42 to drive the speed reduction mechanism portion 22.

As has been described above, a slight gap is kept between the lower surface of the revolving portion 3 and the upper surface of the base 1, and the speed reduction mechanism portion 22 of the reduction gear 2, the intermediate member 6, the revolving portion 3, and the driving motor 4 are rotatably supported by the bearing 23.

When the reduction gear 2 is to be exchanged, first, the bolts 7C fixing the revolving portion 3 to the intermediate member 6 are removed gradually. Then, the revolving portion 3 is moved down by the length of the air gap, together with the arms and so on so as to be put on the upper surface of the base 1 gradually.

Next, the bolts 7B fixing the reduction gear 2 to the intermediate member 6 are removed, so that the intermediate member 6 is released from the reduction gear 2 together with the driving motor 4 and taken out from the through hole 32 to the outside of the revolving portion 3.

Next, the bolts 7A fixing the reduction gear 2 to the base 1 are removed, and the reduction gear 2 is taken out from the through hole 32 to the outside of the revolving portion 3.

Accordingly, the reduction gear 2 can be easily taken out without removing the revolving portion 3 mounted with heavy structures such as the arms and so on from the base 1 by means of a crane or the like.

When the reduction gear 2 is assembled on the base 1, it will do to perform the work reverse to the above-mentioned procedure.

As has been described above, according to the present invention, a through hole having an inner diameter larger than the outer diameter of a stationary portion of a reduction gear is provided in a bottom portion of a revolving portion, and the reduction gear and the revolving portion are coupled by an intermediate member fitting into the through hole, so that the reduction gear can be taken out through the through hole if the intermediate member is removed from the revolving portion. Accordingly, there is an effect that it is possible to provide an industrial robot in which the reduction gear can be exchanged without removing the heavy revolving portion or the heavy structure such as the arms and so on.

INDUSTRIAL AVAILABILITY

The present invention is available as a structure of a revolving mechanism of an industrial robot, particularly an articulated robot.

What is claimed is:

1. An industrial robot comprising:

a base provided with a mounting seat at its central upper portion;

a reduction gear having a stationary portion fixed to said mounting seat so as to be concentric with a vertically extending rotation axis, and a speed reduction mechanism portion supported on said stationary portion through a bearing;

a driving motor for driving said reduction gear; and a revolving portion rotatably supported through said speed reduction mechanism portion of said reduction gear, and mounted with arms;

characterized in that an intermediate member having a disc portion, a flange portion provided on an outer circumference of said disc portion, and a through hole provided in a center of said disc portion is provided between said speed reduction mechanism portion and said revolving portion, in that a through hole is provided in a bottom portion of said revolving portion so as to be concentric with said rotation axis and so as to have an inner diameter larger than an outer diameter of said stationary portion of said reduction gear, in that said disc portion of said intermediate member is fixed to an upper surface of said speed reduction mechanism portion, and said flange portion is fixed to said bottom portion of said revolving portion, in that a lower surface of said revolving portion is made opposite to an upper surface of said base through a gap, and in that said driving motor is fixed to said disc portion of said intermediate member concentrically with said rotation axis, and an output shaft of said driving motor is coupled with said speed reduction mechanism portion.

* * * * *